United States Patent [19]
Kuranuki et al.

[11] Patent Number: 6,081,418
[45] Date of Patent: Jun. 27, 2000

[54] CHIP TYPE SOLID ELECTROLYTIC CAPACITOR

[75] Inventors: Kenji Kuranuki, Muko; Masaki Shiragami, Kyoto, both of Japan

[73] Assignee: Matsushita Electric Industrial Co., Ltd., Japan

[21] Appl. No.: 09/102,583

[22] Filed: Jun. 23, 1998

[30] Foreign Application Priority Data

Jul. 8, 1997 [JP] Japan ................................. 9-182032

[51] Int. Cl.[7] .............................. H01G 9/00; H01G 2/10
[52] U.S. Cl. ......................... 361/523; 361/535; 361/537
[58] Field of Search ................................ 361/523, 525, 361/531, 534, 537, 535, 538, 540–541, 301.4; 29/25.03; 174/52.1

[56] References Cited

U.S. PATENT DOCUMENTS 4,312,026  1/1982  Iwaya et al. ........................ 361/321.1
5,377,073  12/1994  Fukaumi et al. ....................... 361/540
5,687,056  11/1997  Harshe et al. ......................... 361/328

FOREIGN PATENT DOCUMENTS 57-157515   9/1982  Japan .
3-145115    6/1991  Japan ................................... 361/541
5-205984    8/1993  Japan ................................... 361/541
410041190   2/1998  Japan .

*Primary Examiner*—Kristine Kincaid
*Assistant Examiner*—Anthony Dinkins
*Attorney, Agent, or Firm*—Parkhurst & Wendel, L.L.P.

[57] ABSTRACT

Two elements of chip type solid electrolytic capacitors, having substantially the same bottom size and shaped into rectangles and are arranged on a stack corresponding terminals of the two elements are welded using a coupling member. Because of the stacked relation of the capacitors, the capacitance can be enhanced without increasing the mounting space therefor.

4 Claims, 8 Drawing Sheets

CHIP TYPE SOLID ELECTROLYTIC CAPACITOR

FIELD OF THE INVENTION

The present invention relates to a chip type solid electrolytic capacitor having a large capacitance, and comprising a plurality of the capacitors piled up.

BACKGROUND OF THE INVENTION

Recently, a variety of electronic appliances have become smaller in size and accommodate to a higher frequency, which results in requesting a chip type capacitor featuring a low impedance at a high frequency band, a small area occupied by its mounting on a circuit board. On the other hand, new CPUs (central processing unit) of computers consume less power and work faster, which requests the capacitor to have an excellent transient response as well as suppress heating resulting from current increase due to a higher speed. As a result, a capacitor having a large capacitance and a low equivalent series resistance (ESR) is demanded to meet the above requests.

One of the methods to enhance a capacitance of a chip type capacitor is disclosed in the Japanese Patent Application Unexamined Laid Open No. S57-157515, which teaches that a plurality of chip-type capacitors (elements) are piled up and integrated into one capacitor. To be more specific, two chip-type capacitor elements, i.e., the element formed by a rectangular tantalum solid electrolytic capacitor, of which opposite end faces extend terminal plates therefrom, are piled up and bonded each other. Then, the terminal plates of upper and lower elements are bent downward so that both plates are on top of the others, and the terminal plates thus situated are connected by soldering, thereby enhancing a capacitance of the chip-type tantalum solid capacitor.

However, since the terminal plates of this chip-type capacitor are coupled each other by soldering, when the chip-type capacitor is mounted to an electronic appliance by a reflow or flow soldering method, the solder between the terminal plates tends to be melted, whereby the terminal plates are vulnerable to disconnecting, which causes to lower the reliability from the connection view of point. Further, the tantalum solid electrolytic capacitor has not always a small ESR.

SUMMARY OF THE INVENTION

The present invention aims to provide a chip-type solid electrolytic capacitor featuring small in size, having a large capacitance as well as excellent reliability.

The chip-type solid electrolytic capacitor according to the present invention is formed by piling up a plurality of elements of chip type solid electrolytic capacitors, meanwhile, the elements have substantially equal bottom sizes, and the terminals thereof corresponding to each other are coupled electrically by welding. According to this structure, the soldering by the reflow or flow method does not affect the connection between the terminals thanks to the welding, and there is no chance of disconnection in the soldering process. The welding also results in the less progress of contact resistance with age. As a result, the welding realizes an excellent reliability. Since the capacitor elements having substantially same bottom sizes are piled up, the capacitance can be enhanced without increasing a mounting space thereof.

The chip-type solid electrolytic capacitor according to the present invention preferably employs a coupling member between the plates for welding, whereby the terminals can be coupled each other with ease and more firmly. The coupling reliability is thus improved.

The terminals of the chip type solid electrolytic capacitor according to the present invention are preferably coupled by LASER welding, which causes the less progress of contact resistance with age, and further improves the reliability of coupling.

The chip type solid electrolytic capacitor according to the present invention preferably employs a chip type solid electrolytic capacitor, of which solid electrolyte is made of conductive high-polymer, as at least one of the plurality of capacitor elements. This integration of the capacitor employing the conductive high-polymer into the elements results in less ESR particularly in a high frequency band, and as a result, the chip type solid electrolytic capacitor, which further suppresses heating, can be obtained.

DESCRIPTION OF THE PREFERRED EMBODIMENTS (Embodiment 1)

Figure 1:
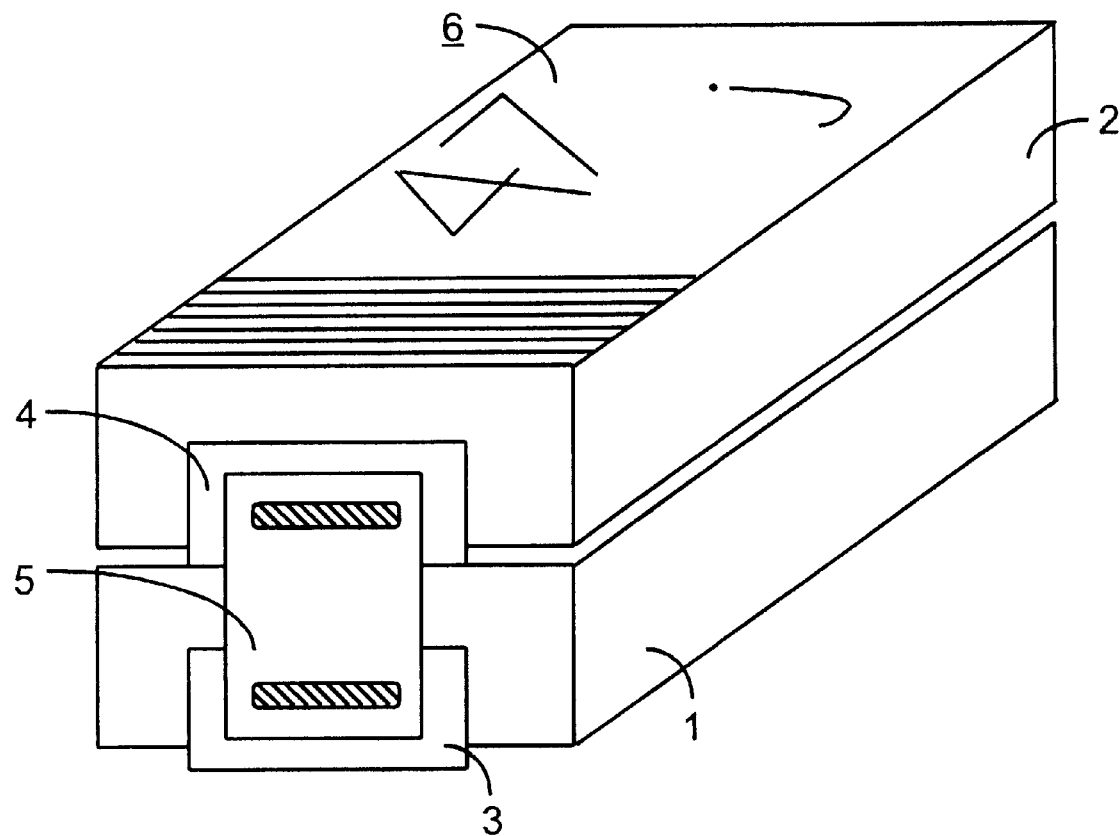
FIG. 1 is a perspective view depicting a chip type aluminum solid electrolytic capacitor utilized in the first exemplary embodiment of the present invention.
Figure 2:
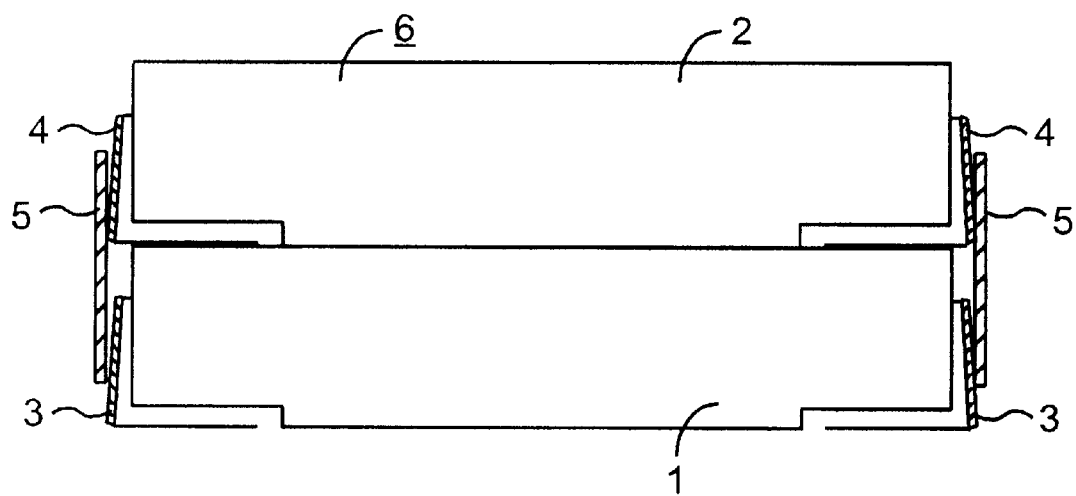
FIG. 2 is a side view of the chip type aluminum solid electrolytic capacitor shown in FIG. 1.

A chip type solid electrolytic capacitor 6 illustrated in FIGS. 1 and 2 is utilized for receiving a respective single unit of chip type aluminum solid electrolytic capacitors 1 and 2 as elements. The capacitor 1 employs polypyrrole of conductive high-polymer as a solid electrolyte. The specification of the capacitor 1 is as follows:

Voltage: 6.3 V, Capacitance: 47 $\mu$F, Dimension (Rectangle);

Length: 7.4 mm, Width: 4.3 mm, Thickness: 1.8 mm.

A pair of terminals 3 pulled out from a base of an outer package molded by resin are bent along an end face respectively. The capacitor 2 having terminals 4 is the same as the capacitor 1.

The capacitor 6 is assembled through the following steps: First, pile up the capacitor 2 on the capacitor 1 so that the upper face of the capacitor 1 contacts with the lower face of the capacitor 2. Second, dispose a coupling member 5 made of metal plate having 0.1 mm thickness so that the member 5 contacts with both the terminals 3 and 4. Then, couple the terminals 3 and 4 to the coupling member 5 by resistance welding. Thus, two capacitors 1 and 2 are coupled in parallel and formed into the chip type aluminum solid electrolytic capacitor 6 with a specification of 6.3 V and 100 μF as well as the approximate dimensions of 7.5 mm long, 4.3 mm wide and 3.6 mm thick.

(Embodiment 2)

Figure 3:
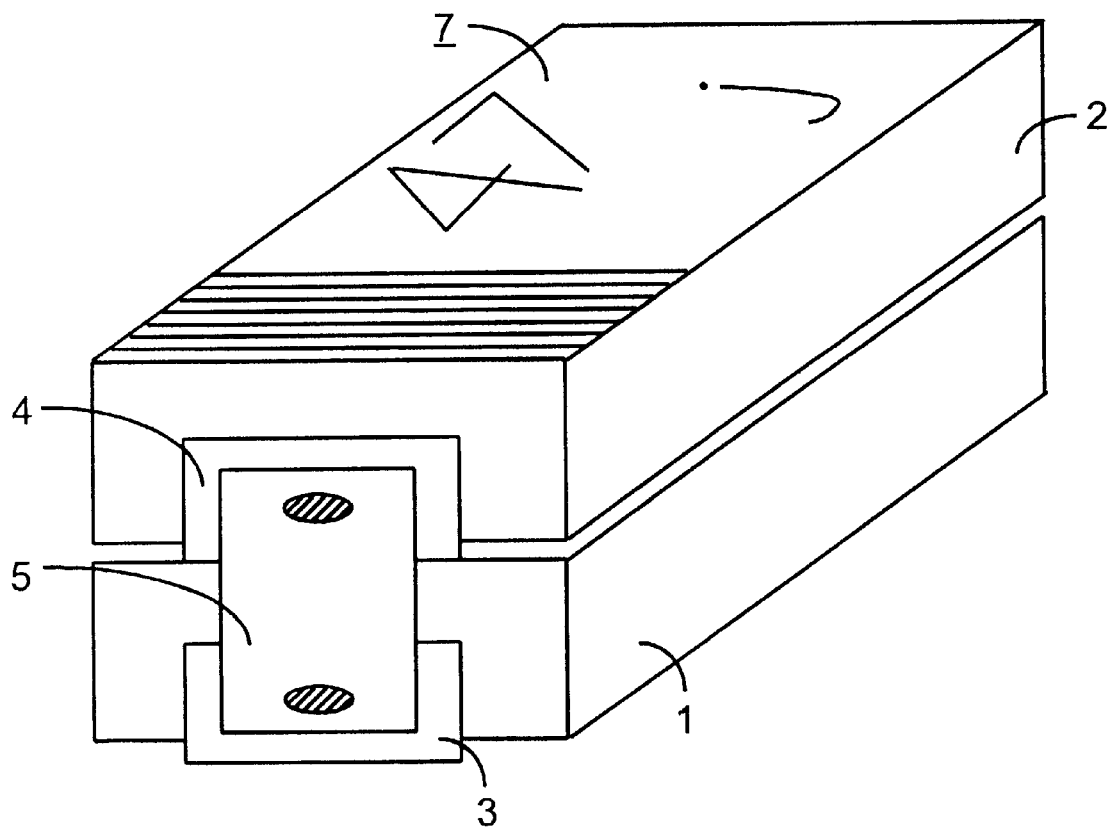
FIG. 3 is a perspective view depicting a chip type aluminum solid electrolytic capacitor utilized in the second exemplary embodiment of the present invention.

A chip type aluminum solid electrolytic capacitor 7 illustrated in FIG. 3 and used in a second exemplary embodiment is identical to the capacitor 6 described in the first exemplary embodiment except a welding method. The descriptions of the capacitors 1 and 2, terminals 3 and 4 as well as a coupling member 5 are thus omitted here.

In the second exemplary embodiment, instead of the resistance welding used in the first exemplary embodiment, LASER welding which controls a LASER beam diameter is employed for coupling the terminals 3 and 4 to the coupling member 5.

(Embodiment 3)

Figure 4:
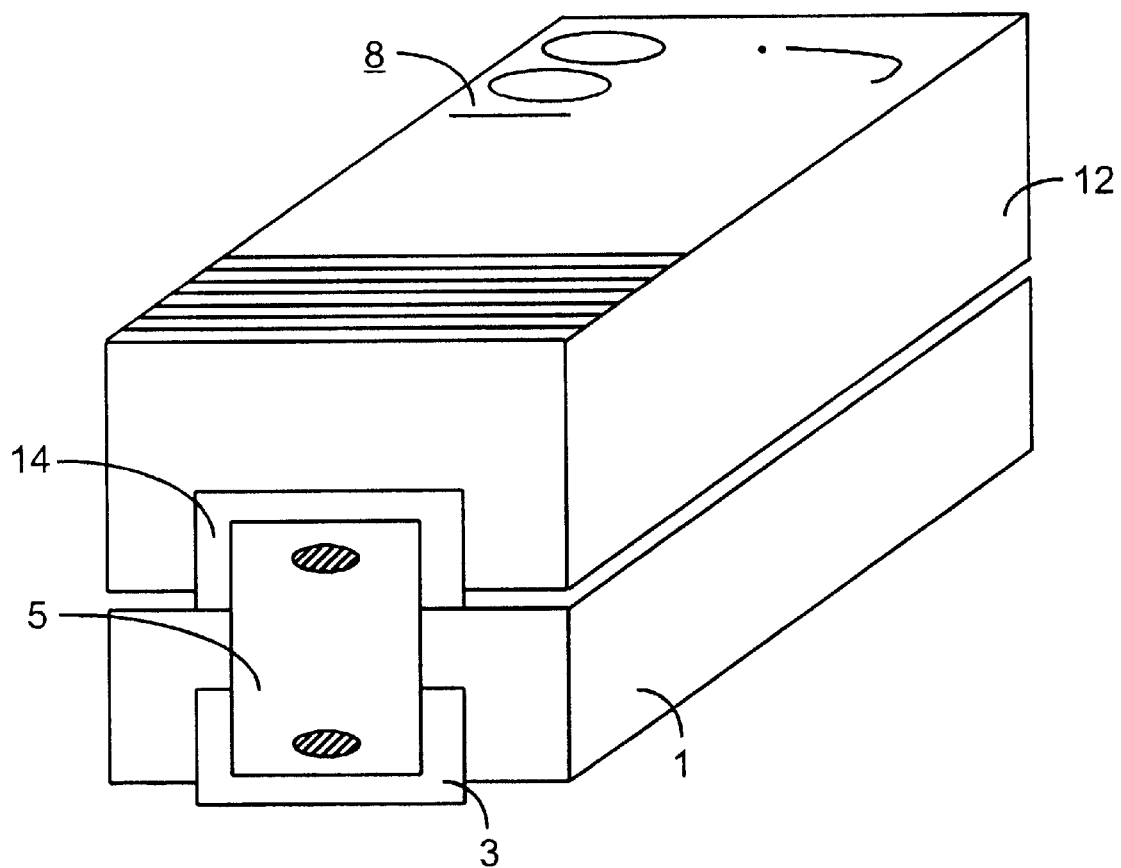
FIG. 4 is a perspective view depicting a chip type aluminum solid electrolytic capacitor utilized in the third exemplary embodiment of the present invention.

A chip type solid electrolytic capacitor 8 illustrated in FIG. 4 and used in a third exemplary embodiment comprises a respective single unit of chip type aluminum solid electrolytic capacitor 1 and a chip type tantalum solid electrolytic capacitor 12, and both are used as integrating elements. The capacitor 1 having the terminals 3 is identical to the capacitor 1 used in the first exemplary embodiment, and the detail thereof is omitted here. The capacitor 12 having terminals 14 employs manganese dioxide as solid electrolyte, and the specification thereof is as follows:

Voltage: 6.3 V, Capacitance: 100 μF, Dimensions (Rectangle);

Length: 7.4 mm, Width: 4.3 mm, Thickness: 2.8 mm.

The capacitor 8 is assembled through the same steps as those in the second exemplary embodiment. First, pile up the capacitor 12 on the capacitor 1 so that the upper face of capacitor 1 contacts with a lower face of the capacitor 12. Second, dispose the coupling member 5 made of metal plate of which thickness is 0.1 mm so that the member 5 contacts with the terminals 3 and 14. Then, weld the terminals 3 and 14 to the coupling member 5 by LASER welding with controlling the LASER beam diameter. The respective single unit of aluminum solid electrolytic capacitor 1 and the tantalum solid electrolytic capacitor 12 are coupled in parallel to form the chip type solid electrolytic capacitor 8, which has the following specification:

Voltage: 6.3 V, Capacitance: 150 μF, Dimensions (Rectangle);

Length: 7.4 mm, Width: 4.3 mm, Thickness: 2.8 mm.

(Embodiment 4)

Figure 5:
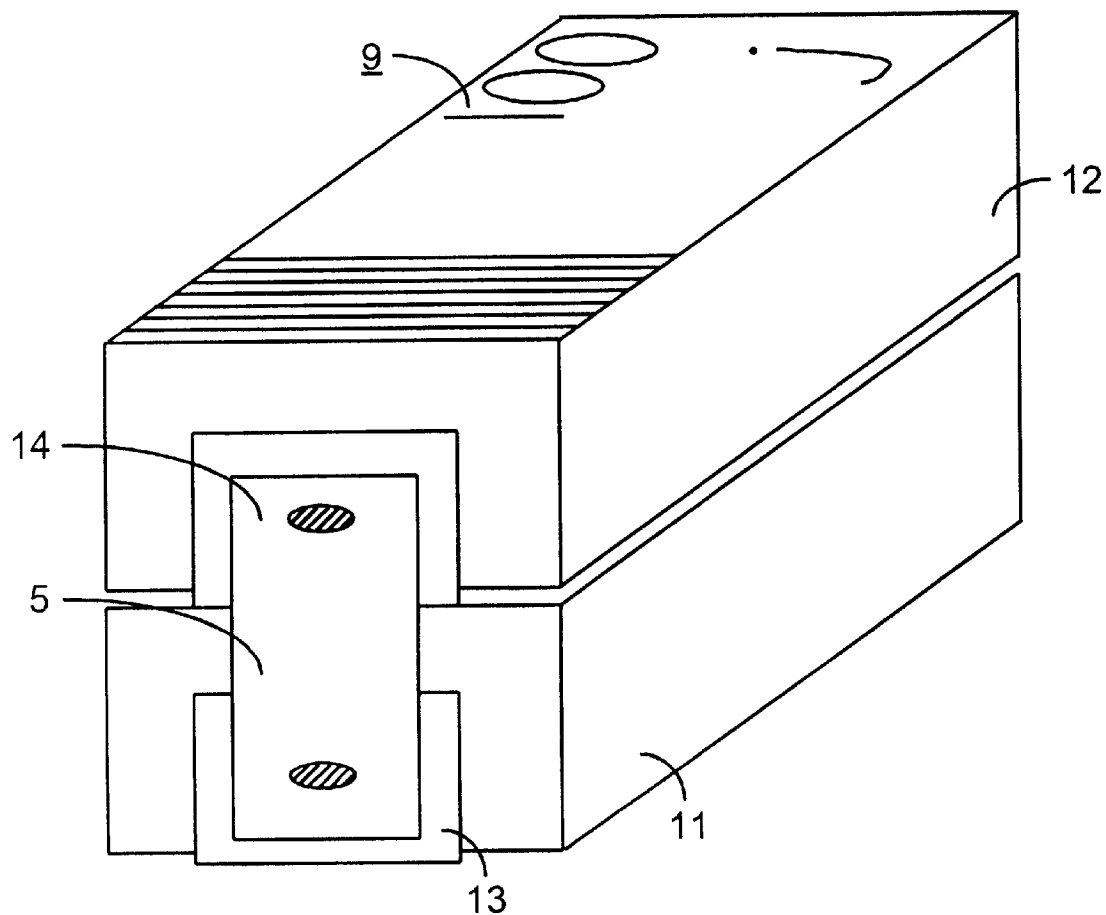
FIG. 5 is a perspective view depicting a chip type tantalum solid electrolytic capacitor utilized in the fourth exemplary embodiment of the present invention.

A chip type solid electrolytic capacitor 9 illustrated in FIG. 5 and used in a fourth exemplary embodiment employs a respective single unit of chip type tantalum solid electrolytic capacitors 11 and 12 as integrating elements. The capacitor 11 having terminals 13 is identical to the capacitor 12 described in the third exemplary embodiment.

The chip type solid electrolytic capacitor 9 is assembled through the same steps as those in the second exemplary embodiment. The terminals 13 and 14 are welded to the coupling member 5 by the LASER welding. The chip type solid electrolyte capacitor 9 is thus produced. The specification is as follows:

Voltage: 6.3 V, Capacitance: 220 μF, Dimensions (Rectangle);

Length: 7.5 mm, Width: 4.3 mm, Thickness: 5.6 mm.

Figure 6:
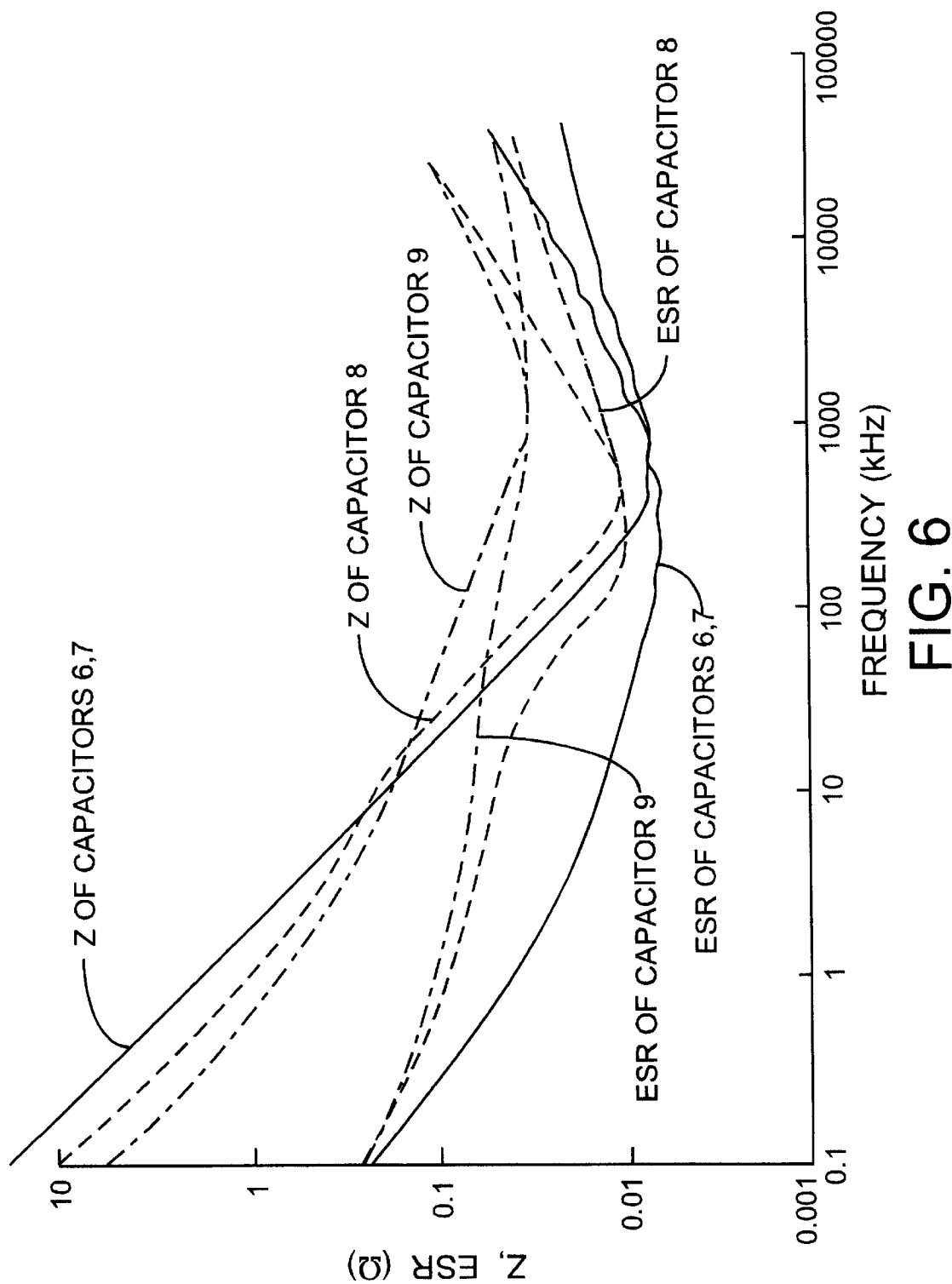
FIG. 6 depicts frequency characteristics of impedance and ESR of the chip type solid electrolytic capacitors utilized in the above exemplary embodiments 1–4.
Figure 7:
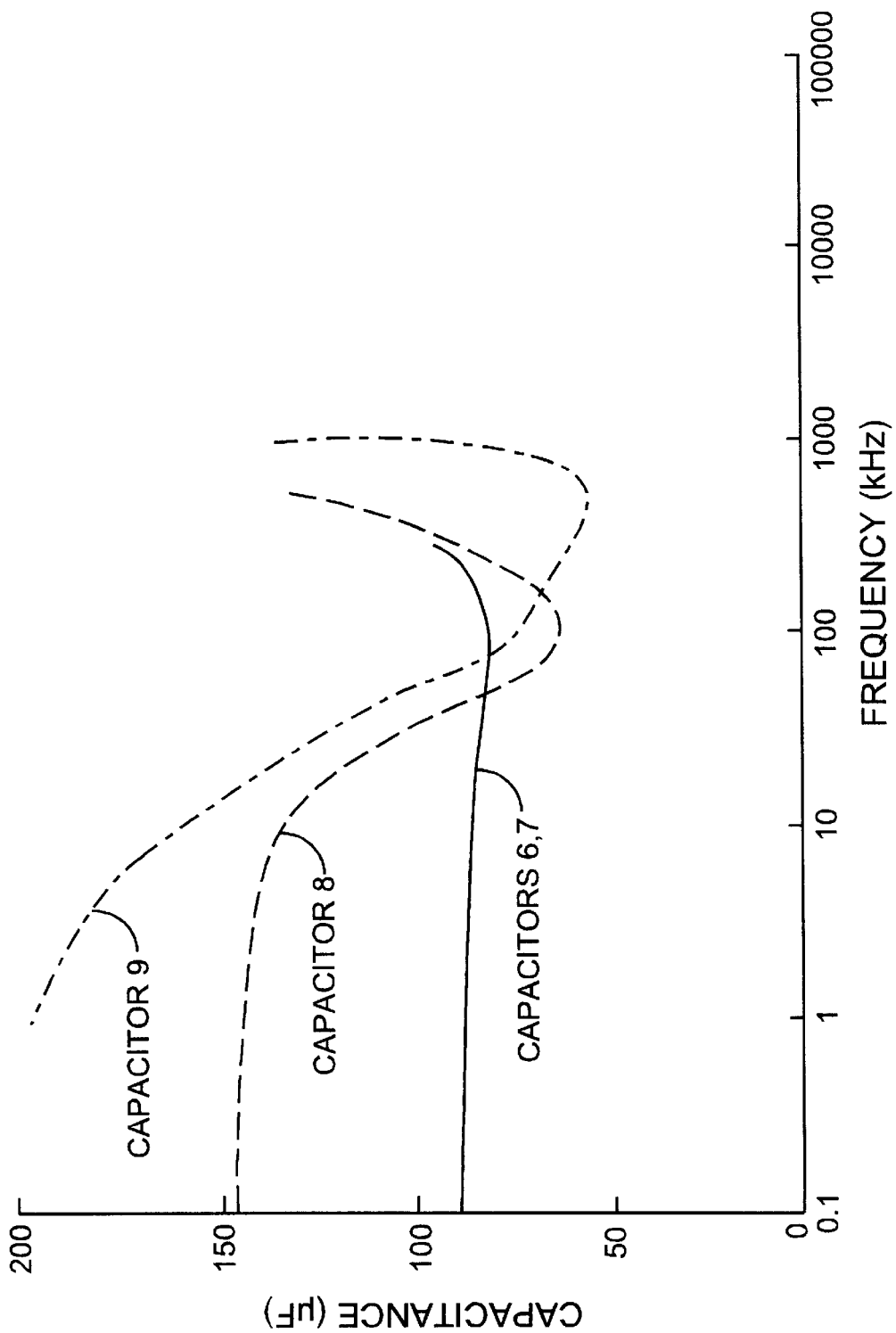
FIG. 7 depicts a frequency characteristic of capacitance of the chip type solid electrolytic capacitors utilized in the above exemplary embodiments 1–4.
Figure 8:
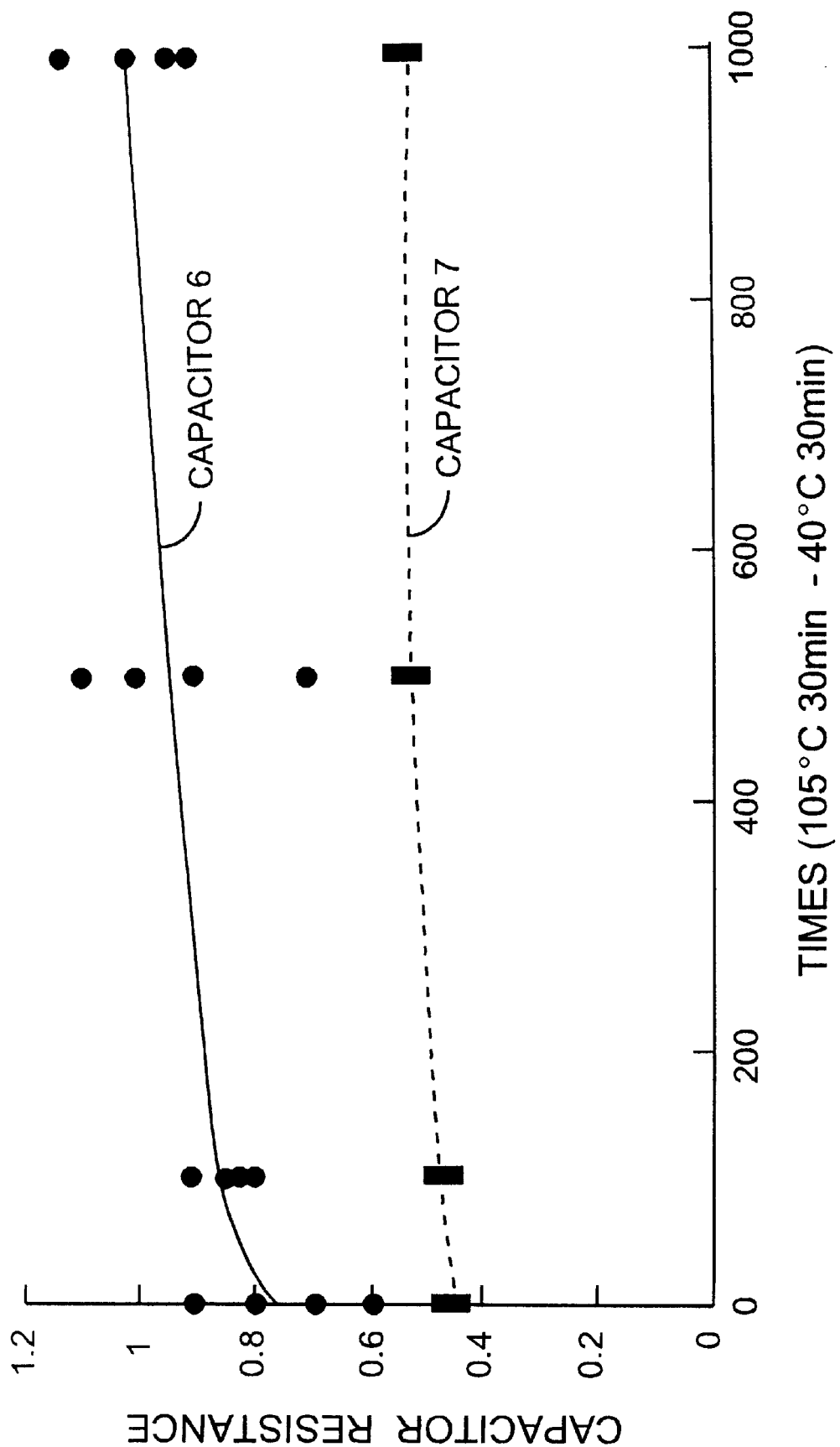
FIG. 8 depicts a progress of contact resistance with age under a heat-shock test applied to the chip type solid electrolytic capacitors utilized in the first and second exemplary embodiments.

The capacitor's characteristics (Impedance Z, respective frequency characteristics of ESR and capacitance) are measured on the chip type solid electrolytic capacitors 6–9 described in the above Embodiments 1–4. FIGS. 6 and 7 show the measuring results. In order to compare a coupling strength between the terminals, a heat shock test is applied to the capacitor employing the resistance welding and the capacitor 7 employing the LASER welding, and progresses of the respective contact resistance with age are measured. FIG. 8 shows the measuring result.

As shown in FIG. 6, the impedance (Z) values and ESR values at a high frequency band are measured minimum on the capacitors 6 and 7. Next to the minimum is measured on the capacitor 8. In other words, the impedance value and the ESR value of the case where the aluminum solid electrolytic capacitor is used as an element and employs conductive high-polymer as solid electrolyte are smaller than the other case where the tantalum solid electrolytic capacitor is used as an element and employs manganese dioxide as solid electrolyte, at the high frequency band. Therefore, in order to lower the ESR value, it is preferable to integrate at least one solid electrolytic capacitor employing conductive high-polymer as solid electrolyte into the elements.

As shown in FIG. 7, variations of a capacitance depending on frequencies are measured minimum on the capacitors 6 and 7. Next to the minimum is measured on the capacitor 8. Therefore, it is also preferable to use the solid electrolytic capacitor employing conductive high-polymer as solid electrolyte.

As shown in FIG. 8, less progress of the contact resistance with age is measured on the capacitor 7 employing the LASER welding than on the capacitor 6 employing the resistance welding. The LASER welding proves to provide a more reliable coupling. Therefore, the LASER welding is preferable.

In the above embodiments, every terminal is coupled with each other by welding, therefore, these couplings are not disconnected during the soldering process when the capacitor is mounted to an electronic appliance. This is a distinct difference from the conventional coupling by soldering.

In the above embodiments, every terminal is coupled with each other via the coupling member; however, e.g., the first terminal is bent to the opposite side so that the first terminal is placed on the second terminal, and these terminals can be directly welded. In the case of three or more elements are coupled, it is difficult to lay one terminal on top of another, and thus it is preferable to use the coupling member to increase the coupling reliability.

The present invention is not limited to the above embodiments, but various modifications are available, e.g., in addition to the resistance welding and LASER welding, other welding methods including arc welding can be used. The number of elements is not limited to two but three or more are available upon request. Further, the chip type capacitor used as an element is not always the aluminum solid electrolytic capacitor employing conductive high-polymer as solid electrolyte, or the tantalum solid electrolytic capacitor employing manganese dioxide as solid electrolyte, but another solid electrolyte capacitor comprising another electrolyte and another electrode can be used as the element. Therefore, the modifications within the spirit and range of the present invention can be included within the scope of the claims described hereinafter.

What is claimed is:

1. A chip type solid electrolytic capacitor comprising a plurality of elements stacked on top of one another, wherein
    each of said plurality of elements comprises a single unit of a chip type solid electrolytic capacitor having an outer package and a terminal extending from said outer package on an end face, and
    said terminals are welded.

2. The chip type solid electrolytic capacitor as defined in claim 1, wherein said terminals are coupled to each other using a coupling member by welding.

3. The chip type solid electrolytic capacitor as defined in claim 1, wherein said welding is LASER welding.

4. The chip type solid electrolytic capacitor as defined in claim 1, wherein at least one of said plurality of elements is a chip type solid electrolytic capacitor employing a conductive high-polymer as a solid electrolyte.

* * * * *